United States Patent [19]

Arai

[11] Patent Number: 5,638,495
[45] Date of Patent: Jun. 10, 1997

[54] PRINTING APPARATUS

[75] Inventor: Tsunekazu Arai, Tama, Japan

[73] Assignee: Canon Kabushiki Kaisha, Tokyo, Japan

[21] Appl. No.: 249,998

[22] Filed: May 27, 1994

Related U.S. Application Data

[63] Continuation of Ser. No. 797,180, Nov. 25, 1991, abandoned.

[30]    Foreign Application Priority Data

Nov. 26, 1990  [JP]  Japan ..................... 2-317909

[51] Int. Cl.$^6$ .................................................. G06K 15/00
[52] U.S. Cl. ............................................. 395/102; 395/110
[58] Field of Search ..................... 395/102, 110, 395/117, 150, 151, 108; 382/177; 345/25, 26, 23, 128, 129, 130, 142, 143; 400/70, 72; 358/451

[56]          References Cited

U.S. PATENT DOCUMENTS

| | | | |
|---|---|---|---|
| 4,573,812 | 3/1986 | Kondo | ................................ 395/108 |
| 4,594,732 | 6/1986 | Tsuji | ............................... 328/9 |
| 4,723,217 | 2/1988 | Nakano et al. | . |
| 5,093,903 | 3/1992 | Sudoh et al. | ........................... 395/110 |

FOREIGN PATENT DOCUMENTS 0080200  6/1983  European Pat. Off. .

OTHER PUBLICATIONS

IBM Technical Disclosure Bulletin, vol. 29, No. 12, May 1987, pp. 5472–5478 "Data Display and Proportional Spacing".

IBM Technical Disclosure Bulletin, vol. 29, No. 12, May 1987, pp. 5437–5438, "Blank Character Handling in Text Process".

English Translation for EPA 0080200A3 by Günther.

*Primary Examiner*—Arthur G. Evans
*Attorney, Agent, or Firm*—Fitzpatrick, Cella, Harper & Scinto

[57]          ABSTRACT

A printing apparatus includes a printer for performing printing on the basis of position information and size information, and a size changing unit for changing the size of a space on the basis of the size information of a character adjacent to a space area upon reception of a space code.

30 Claims, 7 Drawing Sheets

| CODE (1) |
| --- |
| x (1) |
| y (1) |
| dx (1) |
| dy (1) |
| CODE (2) |
| x (2) |
| y (2) |
| dx (2) |
| dy (2) |
| CODE (3) |
| ⋮ |
| CODE (13) |
| x (13) |
| y (13) |
| dx (13) |
| dy (13) |
| PAGE END CODE |

FIG. 4

| CHARACTER CODE (1) |
| --- |
| CHARACTER SIZE (1) |
| CHARACTER CODE (2) |
| CHARACTER SIZE (2) |
| CHARACTER CODE (3) |
| CHARACTER SIZE (3) |
| CHARACTER CODE (4) |
| CHARACTER SIZE (4) |
| CHARACTER CODE (5) |
| CHARACTER SIZE (5) |
| CHARACTER CODE (6) |
| CHARACTER SIZE (6) |
| CHARACTER CODE (7) |
| CHARACTER SIZE (7) |
| LINE FEED CODE |
| CHARACTER CODE (8) |
| CHARACTER SIZE (8) |
| CHARACTER CODE (9) |
| CHARACTER SIZE (9) |
| ⋮ |
| LINE FEED CODE |
| PAGE END CODE |

| モ | ン | ダ | イ | (QUESTION) |
|---|---|---|---|---|
| (1) | プ | リ | ン | タ | ー | は |

(PRINTER)　　　(IS)

FIG. 9

| モ | ン | ダ | イ | (QUESTION) |

| (1) | プ | リ | ン | タ | ー | は |

(PRINTER)　　　(IS)

FIG. 10

PRINTING APPARATUS

This application is a continuation of prior application Ser. No. 07/797,180 filed Nov. 25, 1991, now abandoned.

BACKGROUND OF THE INVENTION

1. Field of the Invention

The present invention relates to a printing apparatus and, more particularly, to a printing apparatus for printing a character string including a type of character having different display and printing character sizes and a type of character having the same display and printing character sizes using an ordinary dot impact printer or the like.

2. Related Background Art

A conventional wordprocessor or the like comprises a keyboard serving as a character input means, a liquid crystal display serving as a character display means, and a printer serving as a character printing means. When a character string including a character having different display and printing character sizes and a character having the same display and printing character size is to be printed, a space between the characters (a space between lines) on the display screen is sent to the printer, thereby printing the characters.

The following drawbacks are presented by the above conventional example.

Figure 6:
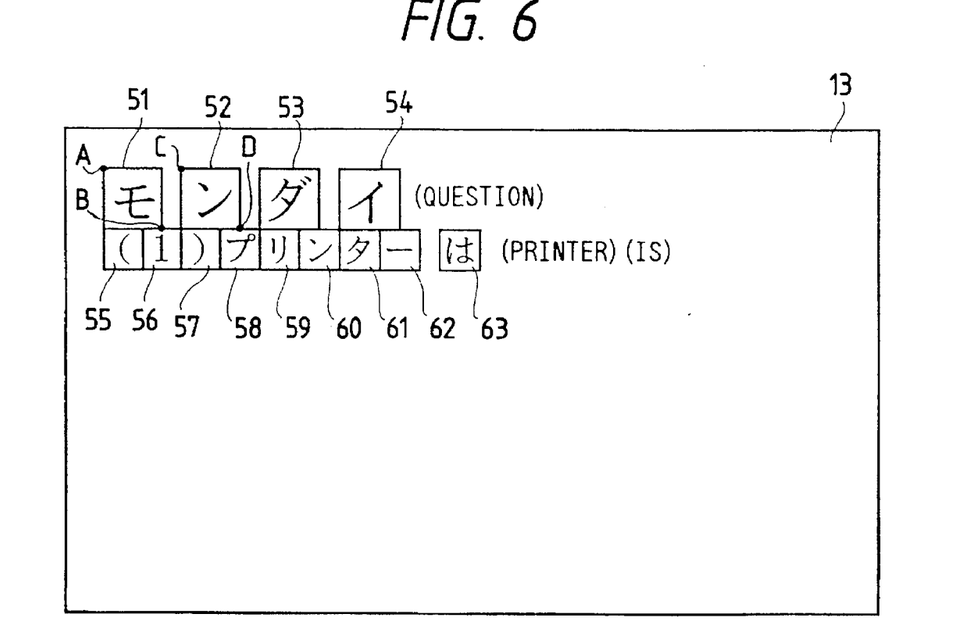
FIG. 6 is a view showing a display content of an input character string.
Figure 8:
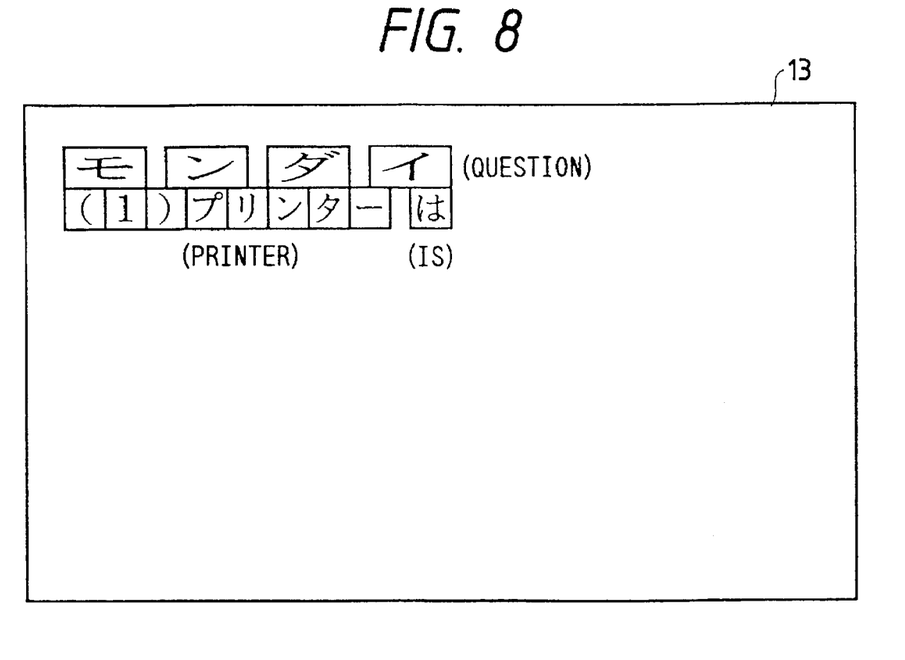
FIG. 8 is a view showing a conventional printed content.

(1) Since the content of the display screen in FIG. 6 is printed as shown in FIG. 8, a positional relationship between the printed characters becomes different from that between the displayed characters.

(2) In order to set the positional relationship between the printed characters equal to that between the displayed characters, a graphic printing function of the printer is used, display character font data is converted into graphic data, and the graphic data is sent to the printer. In this case, the quantity of data is increased several tens of times as compared with a case wherein font data is sent in the form of a character code.

In addition, since characters are processed as graphic data, a large-capacity memory for developing the graphic data into a character string is required which results in an expensive apparatus.

SUMMARY OF THE INVENTION

It is an object of the present invention to provide a printing apparatus, wherein the conventional drawbacks described above can be eliminated, and a positional relationship between printed characters is maintained as that between displayed characters.

In order to achieve the above object of the present invention, there is provided a printing apparatus comprising printing means for performing printing on the basis of position information and size information and size changing means for changing the size of a space on the basis of the size information of a character adjacent to a space portion upon reception of a space code.

In addition, the printing apparatus further comprises input means for inputting a character having the position information and the size information, and character display means for displaying the character on the basis of the position information and the size information.

With the above arrangement, there is provided space size changing means for identifying the space code from a character code sent to the printing means and for changing the space size on the basis of pieces of character size information before and after the space portion, thereby printing the displayed character without changing the relative positional relationship.

It is another object of the present invention to provide an information processing apparatus comprising:

input means for inputting character information and space information;

size input means for inputting size information of the character information;

means for discriminating the size of a character; and size changing means for changing the size of a space represented by the space information between characters, on the basis of a discrimination result of the discriminating means.

It is still another object of the present invention to provide an information processing apparatus comprising:

input means for inputting a character having position information and size information;

character display means for displaying the character on the basis of the position information and the size information; and size changing means for changing the size of a space on the basis of the size information of a character adjacent to a space portion upon reception of a space code.

It is still another object of the present invention to provide a printing apparatus comprising:

printing means for performing printing on the basis of position information and size information; and size changing means for changing the size of a space on the basis of the size information of a character adjacent to a space portion upon reception of a space code.

It is still another object of the present invention to provide an information processing apparatus comprising:

input means for inputting a character;

means for discriminating the size of the character; and size changing means for changing the size of a space between characters on the basis of a discrimination result of the discriminating means.

It is still another object of the present invention to provide an information processing apparatus comprising:

input means for inputting character information and space information;

means for discriminating the size of the character; and size changing means for changing the size of a space represented by the space information between characters on the basis of a discrimination result of the discriminating means.

DETAILED DESCRIPTION OF THE PREFERRED EMBODIMENTS

Figure 1:
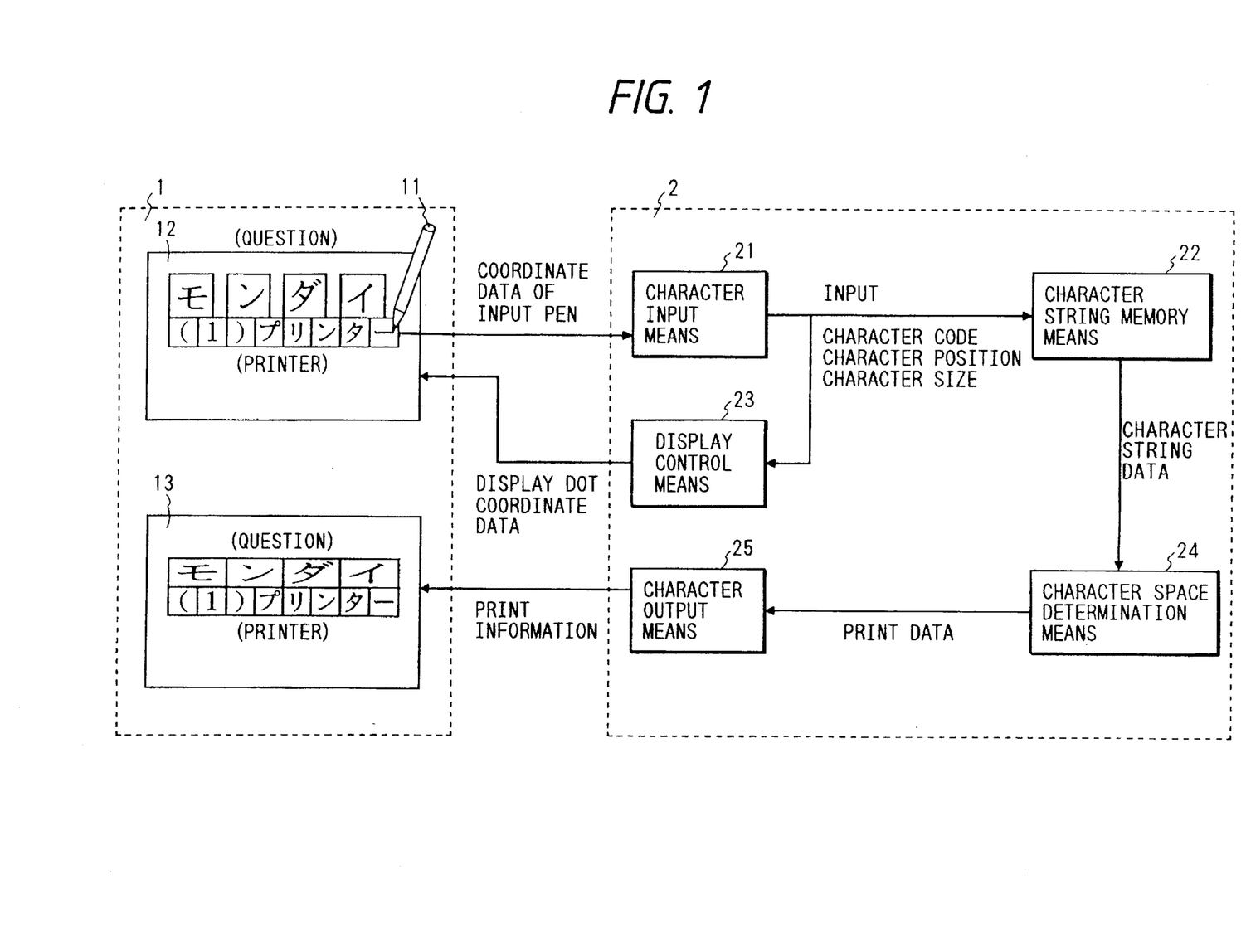
FIG. 1 is a block diagram showing an arrangement of a printing apparatus according to the first embodiment of the present invention.

FIG. 1 is a block diagram showing an arrangement of character string printing processing according to the first embodiment of the present invention.

An input/output block 1 comprises an input/output unit 12 and a printing unit 13. A processing block 2 comprises a character input means 21, a character string memory means 22, a display control means 23, a character space determination means 24, and a character output means 25.

The input/output unit 12 comprises a transparent input board having a transparent electrode matrix, a liquid crystal display, and a VRAM. Coordinate data is input when the transparent input board is pressed with an input pen 11. The coordinate data is sent to the character input means 21. Characters are displayed on the liquid crystal display in accordance with display dot coordinate data sent from the display control means 23. The printing unit 13 comprises a printer for performing printing on the basis of the printing information from the character output means 25.

The character input means 21 receives pen coordinate data sent from the input/output unit 12 and recognizes a character in accordance with a recognition scheme such as a conventional stroke recognition method to obtain a character code, X- and Y-coordinates of the character, and the character size. These pieces of information are sent to the character string memory means 22.

The character string memory means 22 sequentially stores character data input from the character input means 21. When a printing start command is input, the character string memory means 22 sends the stored character string data to the character space determination means 24.

The character space determination means 24 sequentially processes the character string data sent from the character string memory means 22 and generates printing data in which an unnecessary character space is changed or deleted. The printing data is sent to the character output means 25. The character output means 25 sends a character code output from the character space determination means 24 to the output unit 13, thereby causing the output unit 13 to perform printing.

The display control means 23 generates display dot coordinate data in accordance with the character code data, the character position data, and the character size data sent from the character input means 21. The display dot coordinate data is sent to the liquid crystal display in the input/output unit 12, thereby displaying a character.

Figure 2:
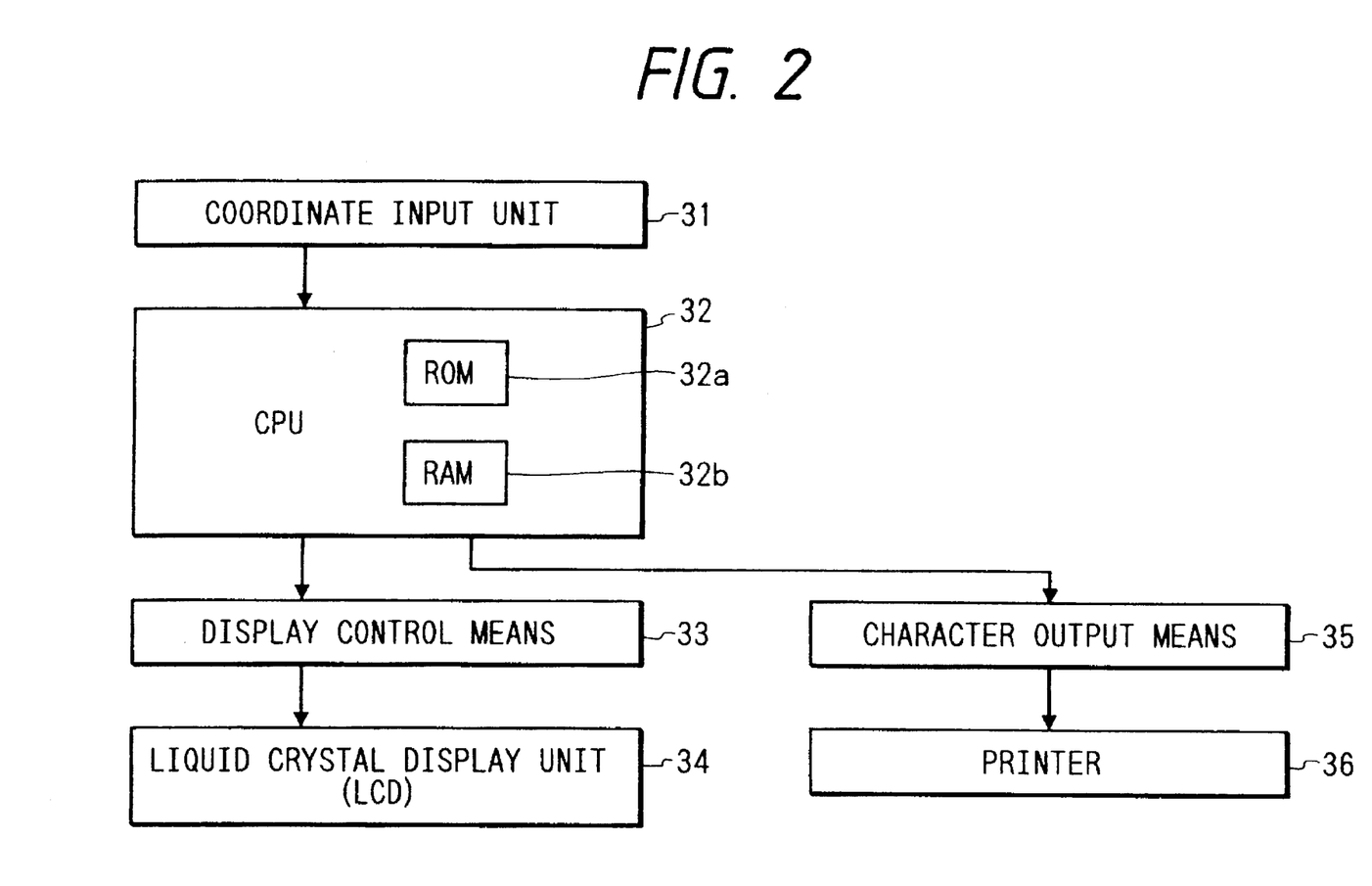
FIG. 2 is a block diagram showing the printing apparatus of the first embodiment.

FIG. 2 is a block diagram of the first embodiment.

A coordinate input unit 31 in the input/output unit 12 serves as a transparent input board having a transparent electrode matrix. Coordinate data is input when the coordinate input unit 31 is pressed with the input pen. The coordinate data is sent to a central processing unit (CPU) 32. The CPU 32 comprises a ROM 32a for storing a processing sequence corresponding to a flow chart in FIG. 5 and a RAM 32b for storing data to be processed. The character string data input from the coordinate input unit 31 and stored in the RAM 32b is processed in accordance with the processing sequence of the ROM 32a. The processed data is output from a character output means 35 to the printing unit 13 (i.e., a printer 36). A liquid crystal display unit 34 in the input/output unit 12 comprises a liquid crystal display and a VRAM. The liquid crystal display unit 34 displays a character in accordance with the display dot character data sent from a display control means 33.

Figure 3:
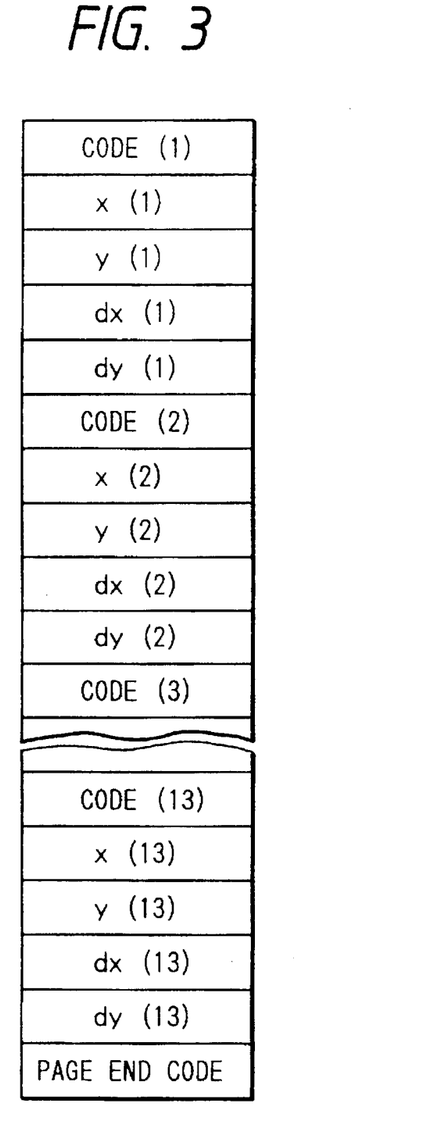
FIG. 3 shows a format of a data structure of character string data.
Figure 4:
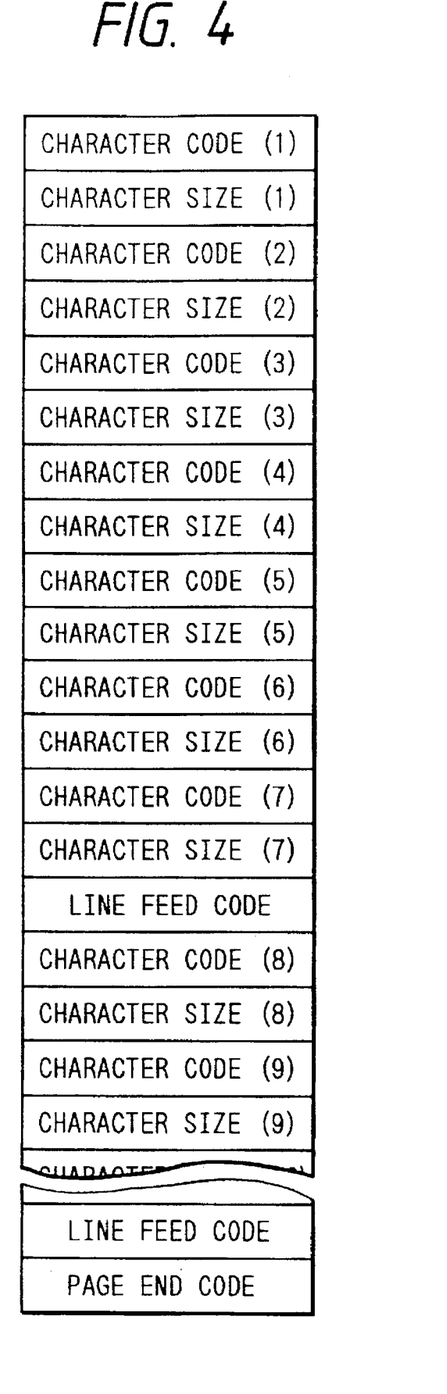
FIG. 4 shows a format of a data structure of printing character string data.

FIGS. 3 and 4 show formats of data structures of character string data stored in the RAM 32b. The character data input from the character input means 21 is stored in the form of the data structure shown in FIG. 3 in the RAM 32b and is transformed into data represented in FIG. 4 in accordance with processing in step S71 of the flow chart in FIG. 5.

Figure 7:
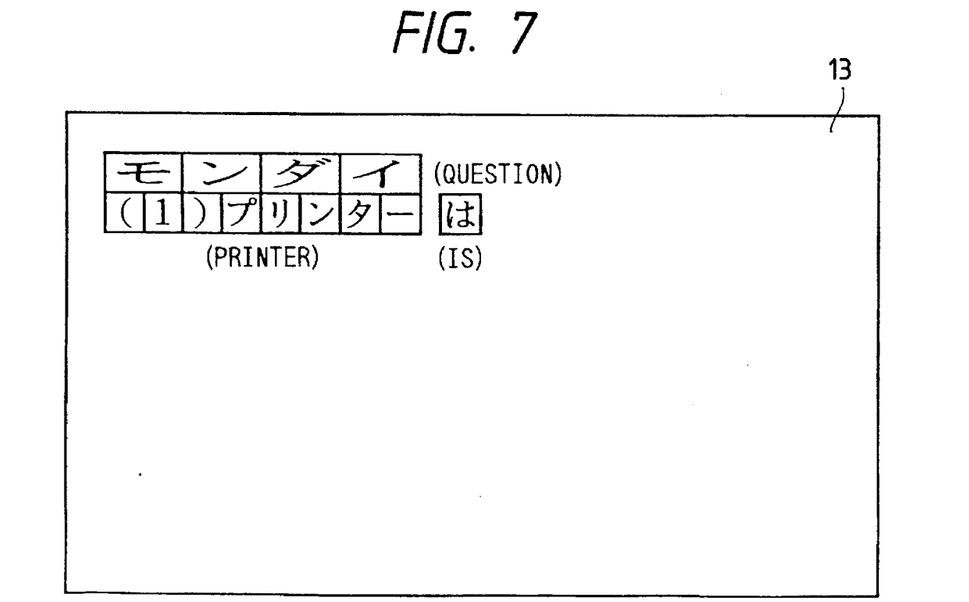
FIG. 7 is a view showing a printed content as a result of processing the input character data shown in FIG. 6.

FIG. 6 shows a display content of the display screen, and FIG. 7 shows a printed content obtained by processing the content of the display screen in accordance with the first embodiment.

A first character 51, i.e., "モ" in FIG. 6 is represented by code(1), x(1), y(1), dx(1), and dy(1) in FIG. 3 and is represented by a character code (1) and a character size (1) in FIG. 4.

The X- and Y-coordinates of a point A of the character 51 are given as x(1) and y(1). The X- and Y-coordinates of a point B are given as x(1)+dx(1) and y(1)+dy(1), respectively. The X- and Y-coordinates of a point C of a second character 52 are given as x(2) and y(2), and the X- and Y-coordinates of a point D are given as x(2)+dx(2) and y(2)+dy(2), respectively. A code (1) represents a character code of the first character and is represented by a general JIS 2-byte code. Dx(1) represents a horizontal size of the first character, and dy(1) represents a vertical size of the first character. Code(1), x(1), y(1), dx(1), and dy(1) respectively comprise 2-byte data. One-character data comprises 10-byte data. The character code of the second character, i.e., a code (2) is stored after dy(1). As shown in FIG. 3, a page end code, i.e., a code (FFFF) is stored after dy(13) of the thirteenth character as the last character.

Referring to FIG. 4, a character code (1) represents a character code of the first character and is represented by a general JIS 2-byte code. A character size (1) represents a size of the first character. A character having a size of 8×8 is represented by a code "1", a character having a size of 8×16 is represented by a code "2", a character having a size of 16×16 is represented by a code "3", and a character having a size of 24×24 is represented by a code "4". The character size code of the first character is determined by dx(1) and dy(1). A line feed code is a code representing a general line feed and is represented by 000A, thus representing the end of each line. A page end code is a code representing an end of a page and is represented by 000B.

Figure 5:
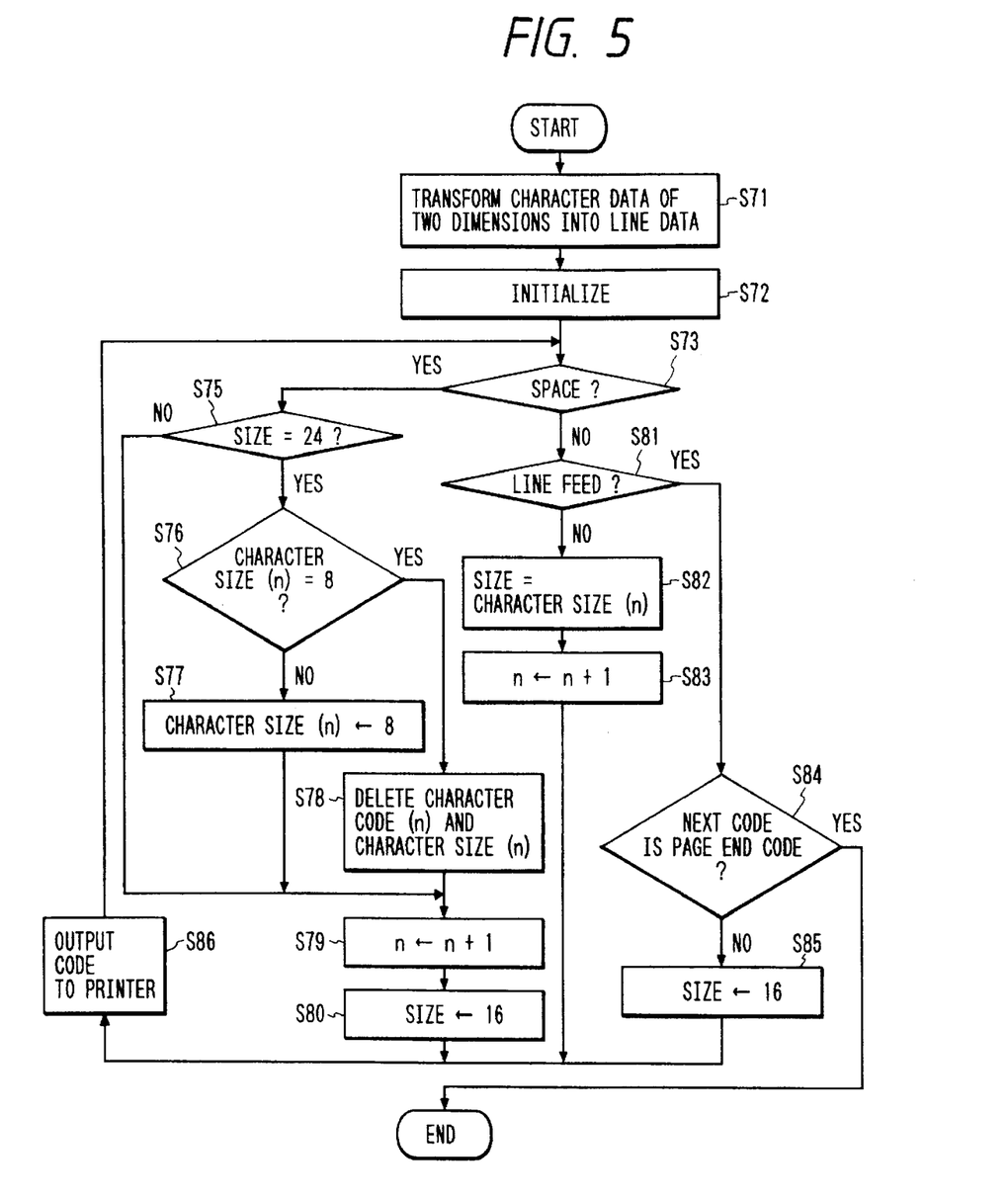
FIG. 5 is a flow chart showing a processing sequence.

FIG. 5 is a flow chart showing the processing sequence of this embodiment. The normal mode of this apparatus is a character input mode. In this mode, an operator writes a character with the input pen 11 on the coordinate input board to input a character. The input character is recognized in accordance with the stroke recognition scheme. The recognized character is stored in the RAM 32b. When a printing command key displayed on the screen or a printing switch as a key switch is depressed, printing processing in the flow chart of FIG. 5 is performed.

In step S71, character data stored in the data structure of FIG. 3 in the RAM 32b is transformed into line data having the data structure shown in FIG. 4. When each character is input from the input/output unit 12, it is stored in the form of the data structure shown in FIG. 3.

In the data structure shown in FIG. 3, the characters are stored in the order of smaller values y(n) as Y-coordinates of the character positions. If characters have the same Y-coordinate, these characters are stored in the order of smaller values x(n), i.e., X-coordinates of the character positions. For example, the characters 51, 52, 53, and 54 have the same Y-coordinate and are stored in the order of smaller X-coordinates, i.e., in the order named.

The character 51, i.e., "ε" in FIG. 6 is represented by code (1), x(1), y(1), dx(1), and dy(1) in FIG. 3. Since this character is the leftmost character on the first line, the value of the code (1) is stored in the character code (1) in FIG. 4. Since the value dx(1) is 24, a code "4" representing a character size of 24×24 is set in the character size (1). When a character having the same Y-coordinate as y(1) is searched, the character 52, i.e., "y" is found. Referring to FIG. 6, an 8-dot space is formed between the characters 51 and 52. That is, since x(1)+dx(1)+8=x(2), then a JIS code "2121" representing a space is set in the character code (2). Since the 8-dot space is formed, a code "2" as a value for a character size of 8×16 (i.e., a half size in the horizontal direction and a full size in the vertical direction) is set in the character size (2), and the code (2) of "y" as the character 52 is set in the character code (3), and a code "4" representing the size of "y" of the character 52 is set in the character size (3).

The above operations continue until characters having different Y-coordinates on the same line are completely processed. When no more characters having different Y-coordinates on the same line are present, a line feed code is set next to the character size of a character at the right end of this line. The character 54, "イ", in FIG. 6 has a character code (7), and no character is present on the right side of the character 54, "イ". A line feed code is set next to the character size (7).

Characters on the next line are then processed. That is, in the data structure of FIG. 4, a code (5) representing "(" of the character 55 is set next to dy(4) of the character 54, "イ". This character is a character at the left end of the next line and is stored in a next character code (8) of the line feed code in FIG. 4. When all the characters on this line are completely processed, a page end code is stored after the line feed code because this line is the last line in FIG. 6. In this manner, the data structure in FIG. 3 is transformed into the data structure of FIG. 4.

In step S72, the work area of the RAM 32b is initialized. An initial value of "16" is stored in an area SIZE for storing a character size, and an initial value of "1" is stored in n representing a currently processed character number. In step S73, it is checked whether the character code is a code "2121" representing a space. If so, since the character code represents the JIS space, the flow advances to step S75 to process the space code.

In step S75, the character size before the space code is checked. If the value of the area SIZE for storing a character size is "24", the size of the previous character is "24". In this case, the flow advances to step S76 to check the character size of the space code. The character sizes of the space code are "8" and "16". If the character size represents "8", the flow advances to step S78. A space having a size of 8×16 is deleted after the character having a size of 24×24, thereby realizing correction during printing. More specifically, at this time, the space having the size of 8×16 is not sent to the printer. If the character size is not "8", it must be "16", so the flow advances to step S77. The character size of the space code having a character size of "16" is changed to "8". In this operation, the space having a size of 16×16 after the character having a size of 24×24 is changed to a space having a size of 8×16, thereby realizing correction during printing.

If the value is not "24" in step S75, processing for the space code need not be performed, and the flow advances to step S79.

In step S79, the character number n for processing the next character is incremented by one. In step S80, the value of the area SIZE for storing a character size is kept to be "16". Therefore, a character of poor appearance is not printed even if the next character also represents a space.

In step S86, the processed characters are output from the character output means 25 to the printing unit 13. When processing is performed through step S77, the space code representing a space having a size of 8×16 is sent to the printer. That is, a control code for producing a character size of 8×16 (i.e., a half size in the horizontal direction and a full size in the vertical direction), and then the space code "2121" is sent. When processing is performed through step S78, since the space is deleted, no code is output to the printer.

On the other hand, when the character code represents any code other than the space code in step S73, it is checked in step S81 whether the character code is a line feed code or a normal character. If the character code (n) is a line feed code (000A), the flow advances to step S84 to check the end of a page. If data next to the line feed code is a page end code (000B), the flow is ended. If the character code is any code other than the end code, the area SIZE is initialized in step S85 to prevent a character of poor appearance from being printed even if the next line is started with a space code. That is, a value of "16" is set in the area SIZE for storing the character size to prepare for processing of the next character code.

In step S81, when the character code is any code other than the line feed code, the flow advances to step S82. The currently processed character size, i.e., character size (n) is stored in the area SIZE for storing a character size for space processing. In step S83, the character number n for processing the next character is incremented by one.

When the above processing is performed, spaces between the input character string consisting of the characters 51, 52, and 53 are deleted, as shown in FIG. 6. The positional relationship between the printed characters is kept unchanged as that between the displayed characters, as shown in FIG. 7.

In the above embodiment, the input unit 31 of the input/output unit 12 comprises the transparent input board having a transparent electrode matrix. The input handwritten characters are transformed into character codes by the character input means 21. This portion of the invention can be realized by a keyboard such as that of a general wordprocessor and a character input means for outputting the input character code, the character position, and the character size.

Figure 9:
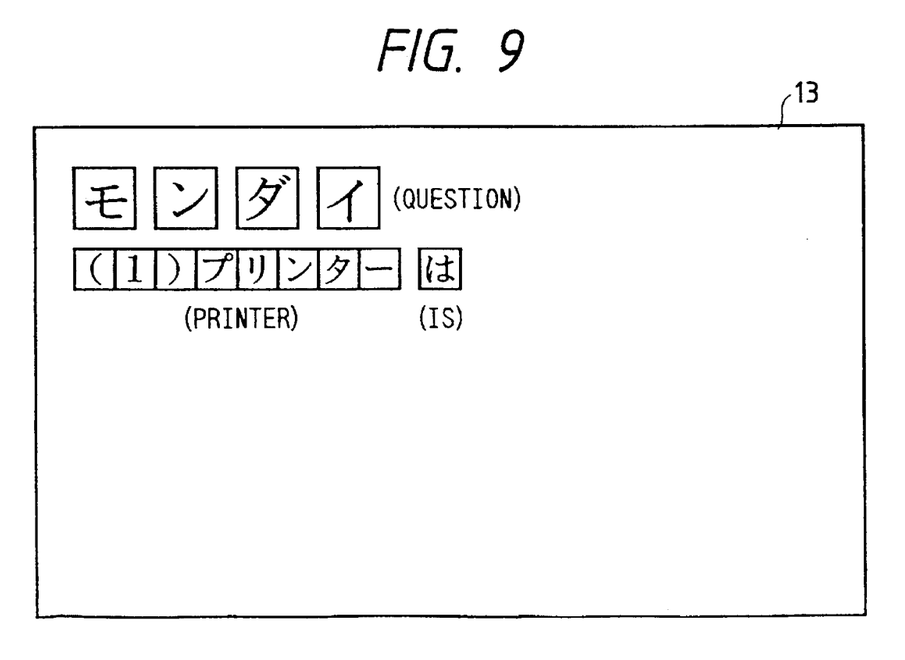
FIG. 9 is a view showing a character input according to the second embodiment of the present invention.
Figure 10:
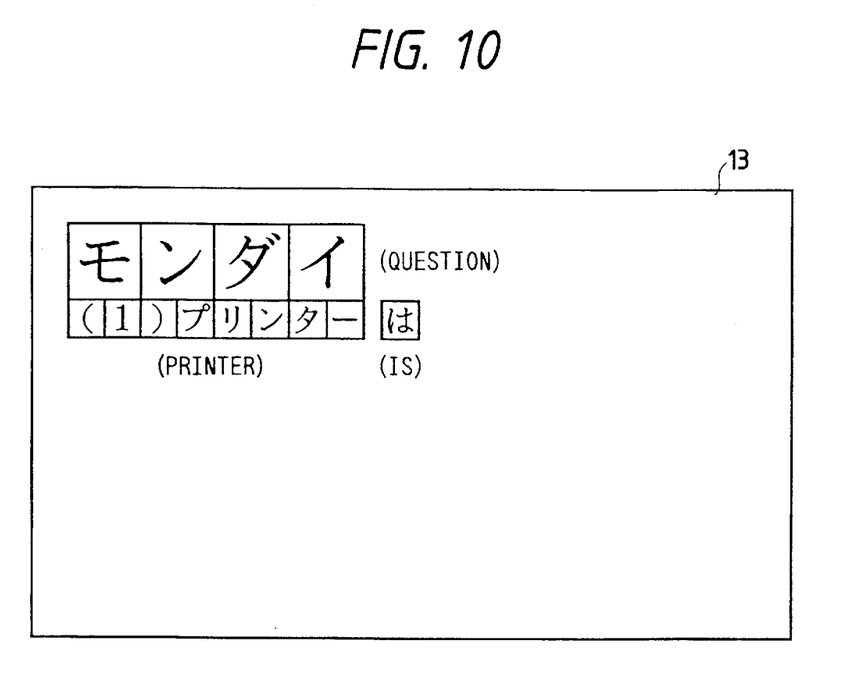
FIG. 10 is a view showing a printed content according to the second embodiment.

In the above embodiment, a space between characters is deleted. However, a space after a character having a size of 24×24 can be deleted in the same manner as described above. In this case, an area SIZE for storing a line size is formed in place of the area SIZE for storing a character size. If a line including a character having a character size of 24×24 appears, "24" is stored in the area SIZE for storing the line size. If a space line appears next, the space line is deleted. An input shown in FIG. 9 can be printed as shown in FIG. 10.

As described above, there is provided a means for deleting a space code between the characters or a space between the lines on the basis of pieces of character size information before and after the space code in accordance with the character code sent to the printing means. There is therefore provided a printing apparatus wherein when a character string including a character having different display and printing character sizes and a character having the same display and printing character size is to be printed, the positional relationship between the printed characters is kept unchanged as that between the displayed characters.

What is claimed is:

1. A printing apparatus comprising:

input means for inputting a character code representing a character to be printed and a space code;

size changing means for changing the size of a space area defined by the space code on the basis of the size information of one character adjacent to a space area defined by the space code upon reception of a space code from said input means, said size changing means deleting a space line, representing a space between lines of characters, defined by the space code, depending on the size of a character input before the space line; and printing means for performing printing on the basis of the input character code, and the space code and the size information.

2. An apparatus according to claim 1, further comprising:

character display means for displaying a character represented by the character code input from said input means.

3. An information processing apparatus comprising:

coordinate input means for inputting a character having position information and size information associated therewith and for inputting space information including a space line representing the space between lines of characters;

character display means for displaying a character on the basis of the position information and the size information; and size changing means for changing the size of a space area on the basis of the size information of one character adjacent to a space area in accordance with space information upon reception of space information input from said coordinate input means, said size changing means deleting the space line depending on the size of a character input before the space line.

4. An information processing apparatus comprising:

input means for inputting a character;

discriminating means for discriminating the size of the character; and size changing means for changing the size of a space between a plurality of characters on the basis of the discrimination of the size of one character adjacent the space by said discriminating means, said size changing means deleting a space line, representing a space between lines of characters, depending on the size of a character input before the space line.

5. An information processing apparatus comprising:

input means for inputting character information and space information;

discriminating means for discriminating the size of the character information; and size changing means for changing the size of a space of the space information representing a space area between a plurality of character information on the basis of the discrimination of the size of character information representing a character adjacent the space area by said discriminating means, said size changing means deleting a space line, representing a space between lines of characters represented by the input character information, defined by the input space information, depending on the size of a character input before the space line.

6. An information processing apparatus comprising:

input means for inputting character information and space information;

size input means for inputting size information of the character information;

discriminating means for discriminating the size of the character information; and size changing means for changing the size of a space of space information representing a space area between character information on the basis of the discriminated size of character information representing a character adjacent the space area by said discriminating means, said size changing means deleting a space line, representing a space between lines of characters representing by the input character information, defined by the input space information, depending on the size of a character input before the space line.

7. An information processing apparatus according to claim 3, wherein said coordinate input means is arranged on said character display means.

8. An information processing apparatus according to claim 3, further comprising first memory means for storing character information input from said coordinate input means, said first memory means storing character information and position information related to the character information.

9. An information processing apparatus according to claim 8, further comprising conversion means for converting the character information of said first memory means to code information.

10. An information processing apparatus according to claim 9, further comprising second memory means for storing the code information converted by said conversion means.

11. An information processing apparatus according to claim 4, wherein said input means comprises coordinate input means.

12. An information processing apparatus according to claim 11, further comprising display means for displaying a character input from said input means.

13. An information processing apparatus according to claim 12, further comprising conversion means for converting a character input from said input means to code information.

14. An information processing apparatus according to claim 13, further comprising means for displaying information represented by code information converted by said conversion means on said display means.

15. An information processing apparatus according to claim 5, wherein said input means comprises coordinate input means.

16. An information processing apparatus according to claim 5, further comprising:

first memory means for storing character information input from said input means;

conversion means for identically converting character information stored in said first memory means to code information; and second memory means for storing the code information converted by said conversion means.

17. An information processing apparatus according to claim 16, further comprising display means for displaying character information of said first memory means and information represented by code information of said second memory means.

18. An information processing apparatus according to claim 6, wherein said input means comprises coordinate input means.

19. An information processing apparatus according to claim 6, further comprising:

first memory means for storing character information input from said input means;

conversion means for identically converting character information stored in said first memory means to code information; and second memory means for storing the code information converted by said conversion means.

20. An information processing apparatus according to claim 19, further comprising display means for displaying character information of said first memory means and information represented by code information of said second memory means.

21. A printing apparatus comprising:

input means for inputting a character code representing a character to be printed, a first space code, and a space line representing a space between lines of characters to be printed;

size changing means for changing the size of a space area defined by the first space code on the basis of the size information of a character to be printed adjacent to a space area defined by the first space code upon reception of the first space code from said input means to produce a second space code, said size changing means deleting the space line depending on the size of a character input before the space line;

printing means for performing printing of the character; and means for selectively sending one of the first and second space codes to said printing means when the size information has a predetermined value.

22. A printing apparatus according to claim 21, wherein said sending means comprises:

means for preventing the first space code from being sent to said printing means when the first space code has a first predetermined value and when the size information has the predetermined value, wherein said printing means performs printing on the basis of the input character code and the size information; and means for transmitting the second space code to said printing means when the first space code has a second predetermined value and when the size information has the predetermined value, wherein said printing means performs printing on the basis of the input character code, the second space code, and the size information.

23. An information processing apparatus comprising:

coordinate input means for inputting a character having position information and size information associated therewith, first space information, and a space line representing a space between lines of characters;

character display means for displaying a character on the basis of the position information and the size information;

size changing means for changing the size of a space area on the basis of the size information of a character to be printed adjacent to a space area in accordance with the first space information upon reception of the first space information input from said coordinate input means to produce second space information, said size changing means deleting the space line depending on the size of a character input before the space line; and means for selectively sending one of the first and second space information to printing means when the size information has a predetermined value.

24. A information processing apparatus according to claim 23, wherein said sending means comprises:

means for preventing the first space information from being sent to the printing means when the first space information has a first predetermined value and the size information has the predetermined value; and means for transmitting the second space information to printing means when the first space information has a second predetermined value and the size information has the predetermined value.

25. An information processing apparatus comprising:

input means for inputting a character;

discriminating means for discriminating the size of the character;

size changing means for changing the size of a space between a plurality of characters by changing a first space code to a second space code on the basis of a discrimination result of said discriminating means, said size changing means deleting a space line representing a space between lines of characters depending on the size of a character input before the space line; and means for selectively sending one of the first and second space codes to printing means when the discriminated size has a predetermined value.

26. An information processing apparatus according to claim 25, wherein said sending means comprises:

means for preventing the first space code from being sent to the printing means when the first space code has a first predetermined value and the discriminated size had the predetermined value; and means for transmitting the second space code to printing means when the first space code has a second predetermined value and the discriminated size has the predetermined value.

27. An information processing apparatus comprising:

input means for inputting character information, first space information, and a space line representing a space between lines of characters of the input character information;

discriminating means for discriminating the size of the character information;

size changing means for changing the size of a space of the first space information representing a space area between a plurality of character information on the basis of a discrimination result of said discriminating means to produce second space information, said size changing means deleting the space line depending on the size of a character input before the space line; and means for selectively sending one of the first and second space information to printing means when the discriminated size of the character information has a predetermined value.

28. An information processing apparatus according to claim 27, wherein said sending means comprises:

means for preventing the first space information from being sent to the printing means when the first space information has a first predetermined value and the discriminated size of the character information has the predetermined value; and means for transmitting the second space information to the printing means when the first space information has a second predetermined value and the discriminated size of the character information has the predetermined value.

29. An information processing apparatus comprising:

input means for inputting character information, first space information, and a space line representing a space between lines of characters of the input character information;

size input means for inputting size information of the character information;

discriminating means for discriminating the size of the character information;

size changing means for changing the size of a space of the first space information representing a space area between character information on the basis of the discrimination result of said discriminating means to produce second space information, said size changing means deleting the space line depending on the size of a character input before the space line; and means for selectively sending one of the first and second space information to printing means when the discriminated size of the character information has a predetermined value.

30. An information processing apparatus according to claim 29, wherein said sending means comprises:

means for preventing the first space information from being sent to the printing means when the first space information has a first predetermined value and the discriminated size of the character information has the predetermined value; and means for transmitting the second space information to the printing means when the first space information has a second predetermined value and the discriminated size of the character information has the predetermined value.

* * * * *

UNITED STATES PATENT AND TRADEMARK OFFICE
CERTIFICATE OF CORRECTION

PATENT NO. : 5,638,495
DATED : June 10, 1997
INVENTOR(S) : TSUNEKAZU ARAI

It is certified that error appears in the above-identified patent and that said Letters Patent is hereby corrected as shown below:

COLUMN 6

Line 29, "end" should read --page end--.

COLUMN 8

Line 22, delete "by" (first occurrence).

COLUMN 10

Line 9, "A" should read --An--.
    Line 38, "had" should read --has--.

Signed and Sealed this

Sixth Day of January, 1998

Attest:

BRUCE LEHMAN

*Attesting Officer*     *Commissioner of Patents and Trademarks*